United States Patent
Kato et al.

(10) Patent No.: US 10,293,531 B2
(45) Date of Patent: May 21, 2019

(54) METHOD FOR MANUFACTURING SEALING DEVICE

(71) Applicant: NOK CORPORATION, Tokyo (JP)

(72) Inventors: Takuya Kato, Fukushima (JP); Go Kanzaki, Fukushima (JP); Kei Sasaki, Fukushima (JP); Naoto Kobayashi, Fukushima (JP)

(73) Assignee: NOK Corporation (JP)

( * ) Notice: Subject to any disclaimer, the term of this patent is extended or adjusted under 35 U.S.C. 154(b) by 451 days.

(21) Appl. No.: 15/032,858

(22) PCT Filed: Jun. 24, 2014

(86) PCT No.: PCT/JP2014/066601
§ 371 (c)(1),
(2) Date: Apr. 28, 2016

(87) PCT Pub. No.: WO2015/072170
PCT Pub. Date: May 21, 2015

(65) Prior Publication Data
US 2016/0250788 A1 Sep. 1, 2016

(30) Foreign Application Priority Data
Nov. 18, 2013 (JP) ................................ 2013-237915

(51) Int. Cl.
*B29C 45/14* (2006.01)
*F16J 15/3232* (2016.01)
(Continued)

(52) U.S. Cl.
CPC .... *B29C 45/1418* (2013.01); *B29C 45/14336* (2013.01); *B29C 45/1671* (2013.01);
(Continued)

(58) Field of Classification Search
CPC ............ B29C 45/1418; B29C 45/1336; B29C 45/1671; B29C 2045/14303; B29C 2045/1459
(Continued)

(56) References Cited

U.S. PATENT DOCUMENTS

| 4,957,680 A | 9/1990 | Saxod et al. |
| 2012/0007316 A1 | 1/2012 | Terasawa |

FOREIGN PATENT DOCUMENTS

| EP | 0926408 A2 | 6/1999 |
| EP | 1146265 A2 | 10/2001 |

(Continued)

OTHER PUBLICATIONS

Extended European Search Report for EP Application No. 14861653.5, dated Oct. 6, 2016 (7 pages).

*Primary Examiner* — Christina A Johnson
*Assistant Examiner* — Xue H Liu
(74) *Attorney, Agent, or Firm* — Harness, Dickey & Pierce, P.L.C.

(57) ABSTRACT

The object of the present invention is to effectively prevent the rust generation on a flange portion and to prevent the deformation of the flange portion due to the filling pressure of a molding material in the manufacture of a sealing device whereby a seal main body comprising a rubber-like elastic material and having a portion that covers both surfaces of the flange portion of a metal reinforcing ring is integrally formed on the reinforcing ring by means of a metal mold. To this end, the flange portion of the reinforcing ring is formed in advance with a shape which is distributed unevenly in the direction opposite the direction in which the flange portion is deformed from its original shape by the filling pressure of the molding material.

9 Claims, 7 Drawing Sheets

(51) Int. Cl.
  *F16J 15/3252* (2016.01)
  *F16J 15/3276* (2016.01)
  *B29C 45/16* (2006.01)
  B29K 21/00 (2006.01)
  B29K 705/00 (2006.01)
  B29L 31/26 (2006.01)

(52) U.S. Cl.
  CPC ....... *F16J 15/3232* (2013.01); *F16J 15/3252* (2013.01); *F16J 15/3276* (2013.01); *B29C 2045/14303* (2013.01); *B29C 2045/14459* (2013.01); *B29K 2021/00* (2013.01); *B29K 2705/00* (2013.01); *B29L 2031/26* (2013.01)

(58) Field of Classification Search
  USPC ........................................................ 264/266
  See application file for complete search history.

(56) References Cited

FOREIGN PATENT DOCUMENTS

| | | |
|---|---|---|
| JP | S60-94321 A | 5/1985 |
| JP | S60-194666 U | 12/1985 |
| JP | H01-104310 U | 7/1989 |
| JP | 2008-281013 A | 11/2008 |
| JP | 2009-090476 A | 4/2009 |

METHOD FOR MANUFACTURING SEALING DEVICE

CROSS-REFERENCE TO RELATED APPLICATIONS

This application is a 371 U.S. National Stage Application of International Application No. PCT/JP2014/066601, filed on Jun. 24, 2014, and published in Japanese as WO 2015/072170 A1 on May 21, 2015. This application claims priority to Japanese Application No. 2013-237915, filed on Nov. 18, 2013. The entire disclosures of the above applications are incorporated herein by reference.

BACKGROUND OF THE INVENTION

Field of the Invention

The present invention relates to a method of manufacturing a sealing device which seals a moving part of a device with a seal lip which is integrally formed in a reinforcing ring.

Description of the Conventional Art

As a sealing means for a bearing portion which rotatably supports a wheel to a wheel suspension device for a motor vehicle, there has been conventionally known a sealing device, for example, as described in Japanese Unexamined Patent Publication No. 2008-281013.

Figure 7:
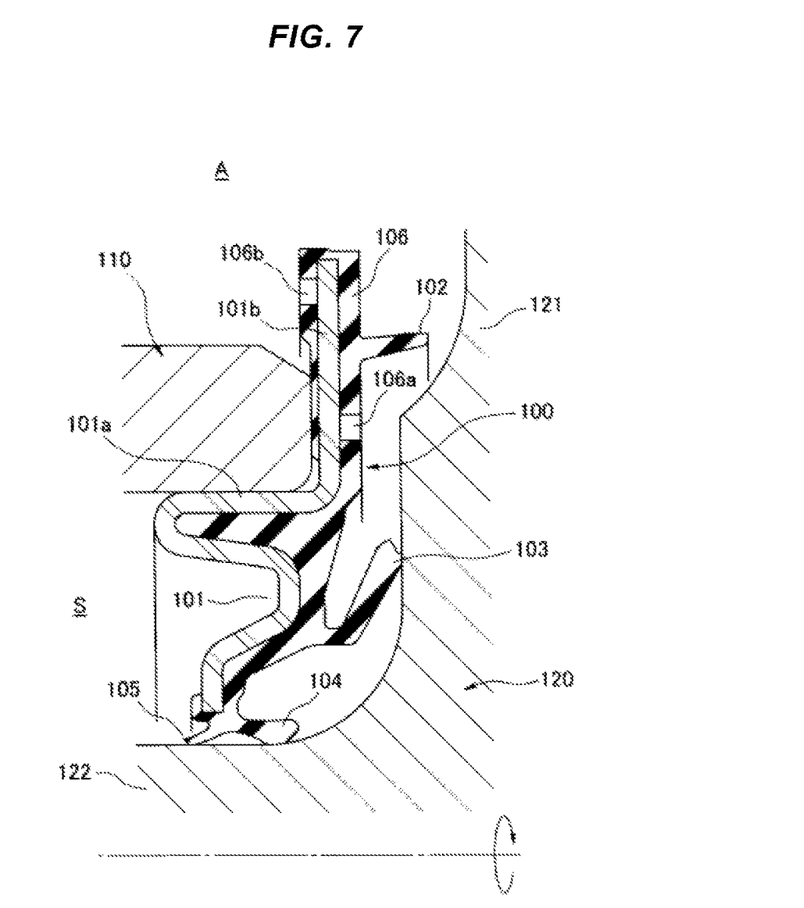
FIG. 7 is a half cross sectional view showing a used state of a sealing device which is manufactured by the prior art.

FIG. 7 shows a sealing device which is the same kind as that described in Japanese Unexamined Patent Publication No. 2008-281013 in a used state, reference numeral 110 denotes an outer ring of a bearing which rotatably supports a wheel to a wheel suspension device for a motor vehicle, and reference numeral 120 denotes a hub in which a center shaft portion 122 thereof is inserted to the outer ring 110 and the wheel (not shown) is attached to an attachment flange 121. A plurality of spherical bodies (not shown) arranged at predetermined intervals in a circumferential direction are retained to a bearing internal space S in a lower left side in the drawing so as to freely roll on a track (not shown) which is formed in an outer peripheral surface of the center shaft portion 122 and an inner peripheral surface of the outer ring 110, and a bearing unit is constructed by the center shaft portion 122 of the hub 120, the outer ring 110 and the spherical bodies.

A sealing device 100 is interposed between an inner peripheral surface of an outer end portion of the outer ring 110 and the outer peripheral surface of the center shaft portion 122 in the hub 120. The sealing device 100 is structured such as to prevent a foreign material such as rain water, muddy water or dusts from intruding into the bearing internal space S from an external portion A, and prevent grease filled in the bearing internal space S from leaking to the external portion A.

Figure 8:
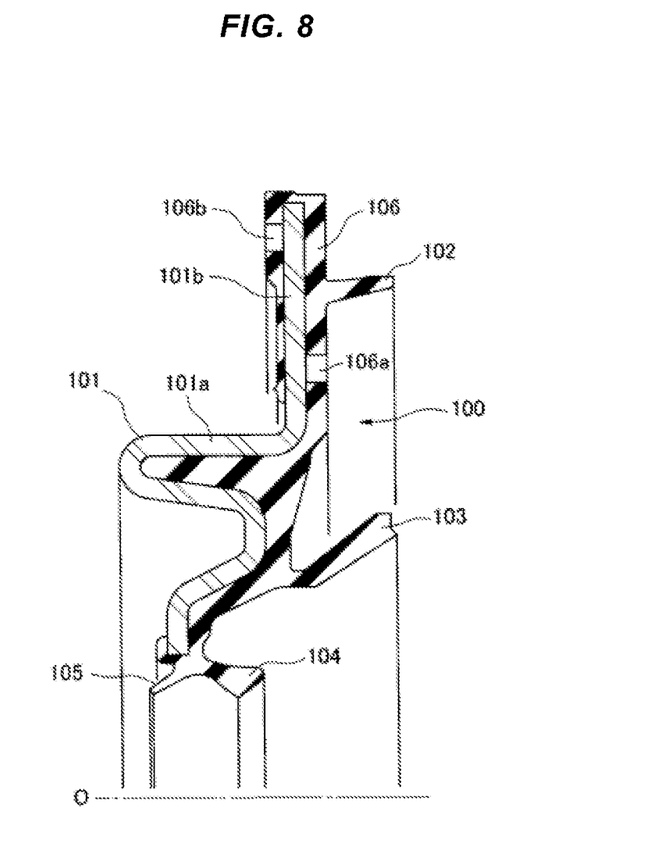
FIG. 8 is a half cross sectional view showing the sealing device manufactured by the prior art in a simple substance.

In detail, the sealing device 100 is constructed by a reinforcing ring 101 made of metal, a labyrinth lip 102, anti-dust lips 103 and 104, and an anti-grease lip 105 as shown in FIG. 8. The labyrinth lip 102, the anti-dust lips 103 and 104 and the anti-grease lip 105 are made of a rubber-like elastic material (a rubber material or a synthetic resin material having a rubber-like elasticity), and is integrally vulcanization bonded to the reinforcing ring 101 via a coating layer 106 which is made of the same rubber-like elastic material.

Further, the labyrinth lip 102 in the outermost diameter side is moved close to and faced to an end surface of the attachment flange 121 of the hub 120 in a non-contact manner, the labyrinth lip 102 in the outermost diameter side being positioned in a back surface side of an outer diameter flange portion 101b which is developed like a disk to an outer peripheral side of the outer ring 110 from an end portion of a fitting tube portion 101a which is pressed into and fitted to an inner peripheral surface of the outer ring 110. As a result, the reinforcing ring 101 serves as a labyrinth seal.

SUMMARY OF THE INVENTION

Problem to be Solved by the Invention

Figure 9:
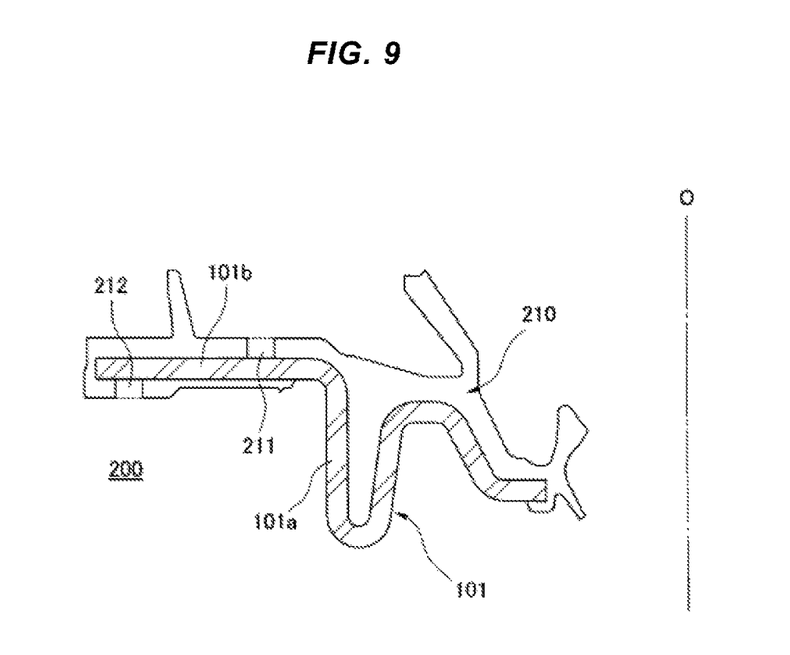
FIG. 9 is an explanatory view showing a method of manufacturing the sealing device according to the prior art.

This kind of sealing device 100 is manufactured, as shown in FIG. 9, by setting the reinforcing ring 101 produced according to a press molding within the metal mold 200, and integrally vulcanization bonding the labyrinth lip 102, the anti-dust lips 103 and 104, the anti-grease lip 105 and the coating layer 106 which are made of the rubber-like elastic material in the reinforcing ring 101 at the same time of the vulcanization molding by filling the molding material into an annular cavity 210 defined by mold clamping between the reinforcing ring 101 and an inner surface of the metal mold 200 from an inner peripheral side so as to heat and pressurize.

However, in the sealing device 100 manufactured as mentioned above, a plurality of hole-like groove portions 106a and 106b constructed by presser projections 211 and 212 for pressing the outer diameter flange portion 101b from both sides in a thickness direction within the metal mold cavity 210 are formed in a uniformly distributed manner in a circumferential direction in the coating layer 106 which covers the outer diameter flange portion 101b of the reinforcing ring 101, the groove portions 106a and 106b are positioned in an outer side (an external portion A) of the seal portion formed by the anti-dust lips 103 and 104 in an installed state shown in FIG. 7, and there is a possibility that a metal surface of the outer diameter flange portion 101b is exposed from the coating layer 106. As a result, there has been a risk that rust is generated from here, and peeling of the coating layer 106 is generated due to progress of the rust.

Figure 10:
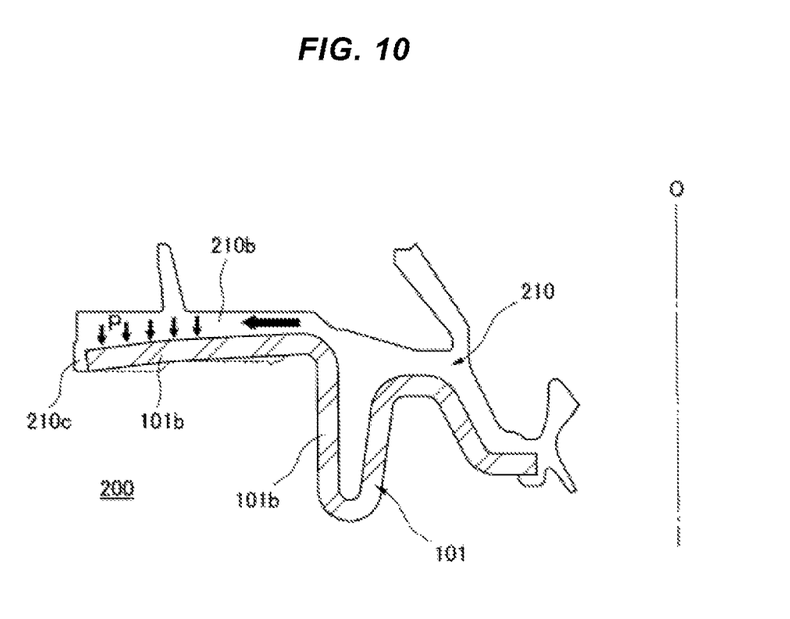
FIG. 10 is an explanatory view showing the other example of the method of manufacturing the sealing device according to the prior art.

Consequently, in order to prevent the groove portions 106a and 106b causing the rust from being formed, it is necessary not to provide the presser projections 211 and 212 for pressing the outer diameter flange portion 101b of the reinforcing ring 101 in the metal mold 200. However, in this case, the outer diameter flange portion 101b is exposed to a bending deformation due to the filling pressure P when the molding material filled into the cavity 210 reaches a space 210b between the outer diameter flange portion 101b of the reinforcing ring 101 and the inner surface of the metal mold, as shown in FIG. 10, and there has been a problem that a normal shape of the flat disk shape can not be formed.

Further, in the case that the outer diameter end of the outer diameter flange portion 101b of the reinforcing ring 101 bent by the filling pressure P comes into contact with the inner surface of the metal mold 200, the molding material reaching the space 210b is hard to run around to an opposite side to the space 210b from a gap 210c in an outer peripheral side of the outer diameter flange portion 101b. As a result, the coating layer 106 is formed only in one side of the outer diameter flange portion 101b, and there is a risk that a defective molding is caused.

The present invention is made by taking the above point into consideration, and a technical object of the present invention is to enable to effectively prevent rust generation without provision of any projection for pressing a flange portion of a reinforcing ring, and to prevent great deformation of the flange portion due to filling pressure of a molding material, in manufacturing of a sealing device obtained by integrally molding a seal main body made of a rubber-like elastic material having a portion covering both surfaces of the flange portion of the reinforcing ring in the reinforcing ring made of a metal with a metal mold.

Means for Solving the Problem

As a means for effectively solving the technical problem mentioned above, a method of manufacturing a sealing device according to the invention of a first aspect is a manufacturing of a seal device obtained by integrally molding a seal main body made of a rubber-like elastic material having a portion covering both surfaces of the flange portion of the reinforcing ring in the reinforcing ring made of a metal within a metal mold, wherein the flange portion is previously formed into a shape which is unevenly distributed to an opposite side to a deforming direction by filling pressure of a molding material from its original shape.

Further, a method of manufacturing a sealing device according to the invention of a second aspect is the method described in the first aspect, wherein an amount of uneven distribution from the original shape of the flange portion of the reinforcing ring is set to a magnitude which approximately corresponds to an amount of deformation by the filling pressure.

Effect of the Invention

According to the manufacturing method of the present invention, even if the flange portion of the reinforcing ring is exposed to the bending deformation by the filling pressure of the space in which the molding material is filled in advance when the seal main body made of the rubber-like elastic material is integrally formed with the reinforcing ring within the metal mold, the flange portion is previously formed so as to be unevenly distributed to the opposite side to the deforming direction from the original shape. As a result, the flange portion is hard to be pressed to the inner surface of the metal mold in the unfilled side by the filling pressure. Therefore, the molding material runs around to the unfilled side and is well shaped. Accordingly, the defective molding can be prevented, and the flange portion is corrected to the original shape or a shape which is approximate to the original shape by the filling pressure from the unevenly distributed shape to the opposite side to the deforming direction. Further, it is possible to provide a sealing device which can effectively prevent the rust generation in the flange portion.

DETAILED DESCRIPTION OF PREFERRED EMBODIMENTS

A description will be given below of preferable embodiments of a method of manufacturing a sealing device according to the present invention with reference to the accompanying drawings.

Figure 1:
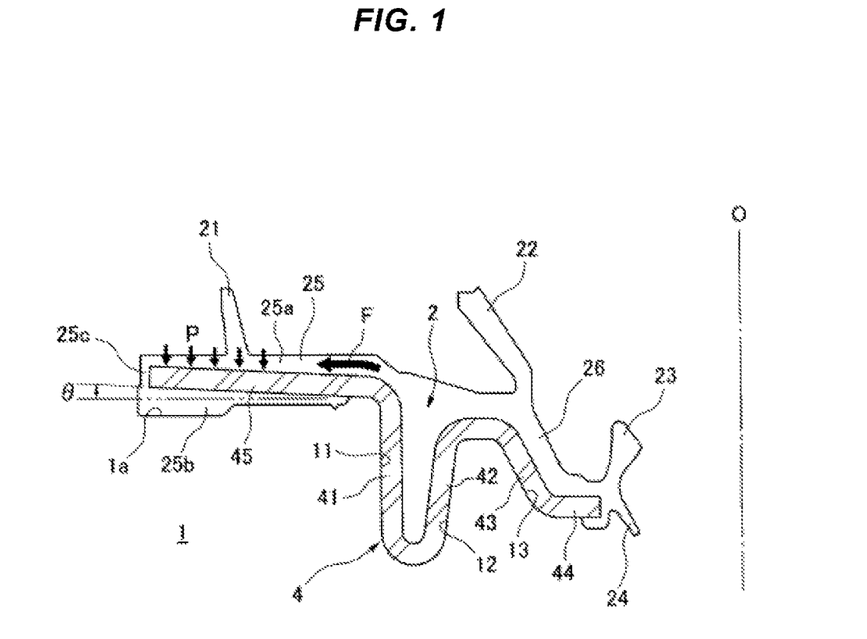
FIG. 1 is an explanatory view showing a first embodiment of a method of manufacturing a sealing device according to the present invention.

First of all, FIG. 1 shows a first embodiment, and reference numeral 2 denotes a cavity which is defined by mold clamping of a metal mold 1 between an inner surface of the metal mold 1 and a reinforcing ring 4 for a sealing device set within the metal mold 1.

The reinforcing ring 4 is manufactured by punching press molding of a metal plate such as a steel plate, and is constructed by a fitting tube portion 41, an annular fold-back portion 42 which is formed so as to be folded back to an inner peripheral side from one end in an axial direction, a conical tube portion 43 which is again folded back from the fold-back portion 42 and extends while being inclined to an inner diameter side, an inner diameter flange portion 44 which extends to an inner diameter side from a small-diameter end portion of the conical tube portion 43, and an outer diameter flange portion 45 which expands to an outer diameter side from the other end in an axial direction of the fitting tube portion 41.

The metal mold 1 is constructed by a plurality of split molds which can be collided and fitted with each other and separated from each other, and the cavity 2 defined by the mold clamping between the metal mold and the reinforcing ring 4 set in the metal mold 1 is constructed by a labyrinth lip forming space 21, anti-dust lip forming spaces 22 and 23 in an inner diameter side thereof, an anti-grease lip forming space 24, an outer diameter flange portion coating layer forming space 25, and an inner diameter coating layer forming space 26 in an inner diameter side thereof. Further, the outer diameter flange portion coating layer forming space 25 is formed astride both sides in a thickness direction (an axial direction) through an outer peripheral side of an outer diameter end portion of an outer diameter flange portion 45 in the reinforcing ring 4, the labyrinth lip forming space 21 is positioned in a back surface side of the outer diameter flange portion 45 of the reinforcing ring 4 and extends from the outer diameter flange portion coating layer forming space 25, and the anti-dust lip forming spaces 22 and 23 and the anti-grease lip forming space 24 extend from the inner diameter coating layer forming space 26.

The outer diameter flange portion 45 in the reinforcing ring 4 is formed into a disk shape in its original shape in which the outer diameter flange portion is buried in an inner portion of a finished product of the sealing device 3 shown in FIG. 2 mentioned later, however, is formed into a gently inclined shape which is previously distributed unevenly from the original shape at a degree approximately corresponding to an amount of bending deformation due to a filling pressure P of a molding material to an opposite side to a deforming direction of the filling pressure P of the molding material to the cavity 2 before being set to the metal mold 1. In detail, an angle θ of incline of the outer diameter flange portion 45 in relation to a plane which is orthogonal to an axis O approximately corresponds to a finally deforming angle due to a spring back after the deformation by the filling pressure P.

Further, in an inner surface of the metal mold 1, there are formed a fitting surface 11 to an outer peripheral surface of the fitting tube portion 41 in the reinforcing ring 4, a fitting surface 12 to an inner peripheral surface of the fold-back portion 42, and a fitting surface 13 to an outer peripheral surface of the conical tube portion 43.

Further, in the forming by the metal mold 1, first of all, the reinforcing ring 4 is set to the metal mold 1 and the mold clamping is performed. At this time, the outer diameter flange portion 45 in the reinforcing ring 4 exists within the outer diameter flange portion coating layer forming space 25 in the cavity 2, and is in a state of being inclined at the angle θ to a side of a space 25a in the side that the labyrinth lip forming space 21 exists in the outer diameter flange portion coating layer forming space 25.

Next, a molding material (a rubber material for forming) is filled into the cavity 2 defined by the mold clamping between the inner surface of the metal mold 1 and the reinforcing ring 4 from an inner peripheral side thereof. The molding material is filled in advance to the space 25a in the side that the labyrinth lip forming space 21 exists, in a process that the molding material flows into the outer diameter flange portion coating layer forming space 25 in the cavity 2, as shown by an arrow F in FIG. 1. As a result, the outer diameter flange portion 45 is exposed to a bending deformation toward an unfilled space 25b side, due to the filling pressure P of the molding material, in more detail, a pressure difference from the unfilled space 25b in the opposite side in relation to the outer diameter flange portion 45 of the reinforcing ring 4.

Here, since the outer diameter flange portion 45 of the reinforcing ring 4 is formed into the shape which is previously inclined at the angle θ approximately corresponding to the amount of deformation to the opposite side to the direction of the bending deformation by the filling pressure P from the plane orthogonal to the axis O before the filling of the molding material, the outer diameter flange portion 45 is corrected to the original disk shape or the shape which is approximate to the original disk shape, on the basis of the bending deformation to the space 25b side by the filling pressure P. Further, the outer diameter end portion of the outer diameter flange portion 45 is not accordingly pressed to the metal mold inner surface 1a in the space 25b side. As a result, the molding material which is filled in advance to the space 25a in the side in which the labyrinth lip forming space 21 exists is smoothly filled in the space 25b while bypassing a gap 25c in an outer peripheral side of the outer diameter flange portion 45.

Figure 2:
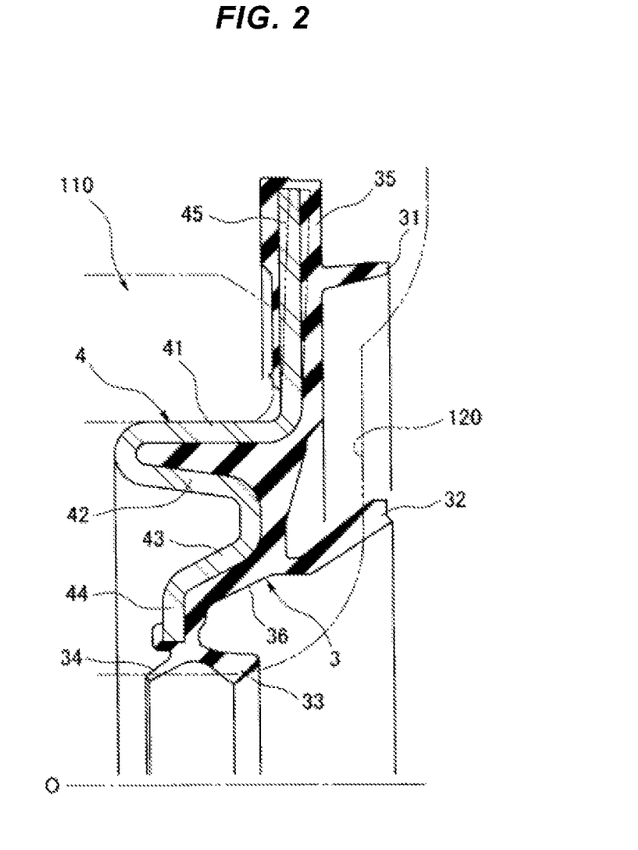
FIG. 2 is a half cross sectional view showing the sealing device which is manufactured by the first embodiment of the method of manufacturing the sealing device according to the present invention.

The sealing device taken out by mold opening after the forming step mentioned above is provided with the reinforcing ring 4, and a seal main body 3 which is integrally vulcanization bonded to the reinforcing ring and is made of a rubber-like elastic material, as shown in FIG. 2. The seal main body 3 is constructed by a labyrinth lip 31 which is positioned in a back surface side of the outer diameter flange portion 45 of the reinforcing ring 4, an anti-dust lip 32 which is positioned in a back surface side of the conical tube portion 43 in the reinforcing ring 4, an anti-dust lip 33 and an anti-grease lip 34 which are positioned in an inner diameter portion of the inner diameter flange portion 44 in the reinforcing ring 4, an outer diameter flange portion coating layer 35 which is formed so as to coat the outer diameter flange portion 45 of the reinforcing ring 4, and an inner diameter coating layer 36 which is connected to the outer diameter flange portion coating layer 35, and is formed so as to coat a surface reaching an inner peripheral edge of the inner diameter flange portion 44 from an inner peripheral surface of the fitting tube portion 41 in the reinforcing ring 4 via an outer peripheral surface of the fold-back portion 42 and an inner peripheral surface of the conical tube portion 43. The labyrinth lip 31 extends from the outer diameter flange portion coating layer 35, and the anti-dust lips 32 and 33 and the anti-grease lip 34 extend from the inner diameter coating layer 36.

The sealing device is used as a sealing means for a bearing unit which rotatably supports a wheel to a wheel suspension device for a motor vehicle, the outer peripheral surface of the fitting tube portion 41 in the reinforcing ring 4 is pressed into and fitted to the inner peripheral surface of the outer ring 110 of the bearing unit, the anti-dust lips 32 and 33 and the anti-grease lip 34 are slidably brought into close contact with the hub 120 in the bearing unit, and the labyrinth lip 31 positioned in the back surface side of the outer diameter flange portion 45 in the reinforcing ring 4 extending to the outer peripheral side of the outer ring 110 is close to and opposed to the hub 120 side in a non-contact manner. As a result, the sealing device can prevent the foreign material such as the rain water, the muddy water or the dusts from intruding into the bearing internal space S from the external portion A, and can prevent the grease filled in the bearing internal space S from leaking out to the external portion A.

Further, according to the manufacturing method mentioned above, the outer diameter flange portion 45 of the reinforcing ring 4 is corrected to the approximately disk shape shown by a solid line at the forming time of the seal main body 3 from the inclined shape according to the previous forming shown by a two-dot chain line in FIG. 2, a molding trace due to the presser projections 211 and 212 of the metal mold 200 shown in FIG. 9 which is previously described does not exist, and the outer diameter flange portion 45 of the reinforcing ring 4 is completely coated with the outer diameter flange portion coating layer 35 in its outer side of the seal portion by the anti-dust lips 32 and 33 and the close contact portion with the outer ring 110. As a result, it is possible to effectively prevent the rust from being generated due to the exposure to the muddy water in the external portion.

Figure 3:
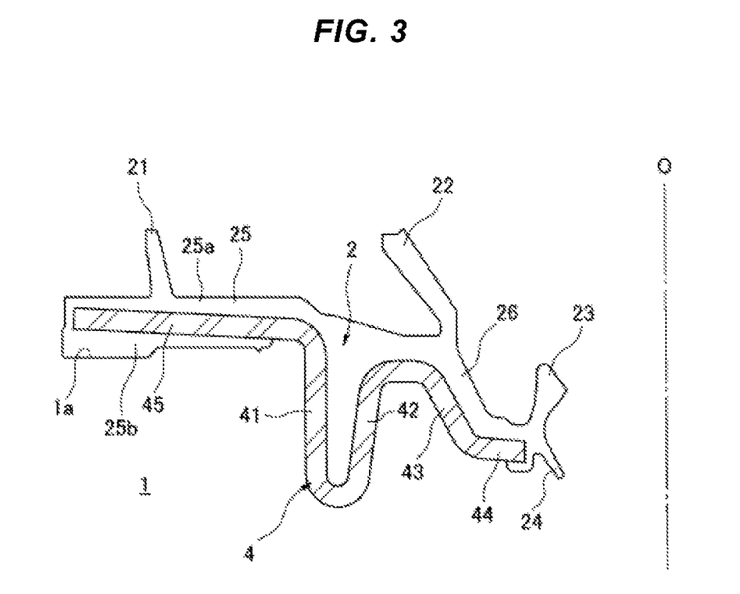
FIG. 3 is an explanatory view showing a second embodiment of the method of manufacturing the sealing device according to the present invention.

Next, FIGS. 3 to 6 show the other embodiments of the method of manufacturing the sealing device according to the present invention. Among them, a second embodiment shown in FIG. 3 is structured such that the inner diameter flange portion 44 of the reinforcing ring 4 is formed into a shape which is inclined to an opposite side to the anti-dust lip forming space 23 in the shown set state to the metal mold 1 in comparison with the plane which is orthogonal to the axis O, in addition to the structure according to the first embodiment mentioned above.

According to the structure mentioned above, a flow path of the molding material to the inner diameter coating layer forming space 26 in the cavity 2 from the gate is widened and a flow resistance can be made small.

Figure 4:
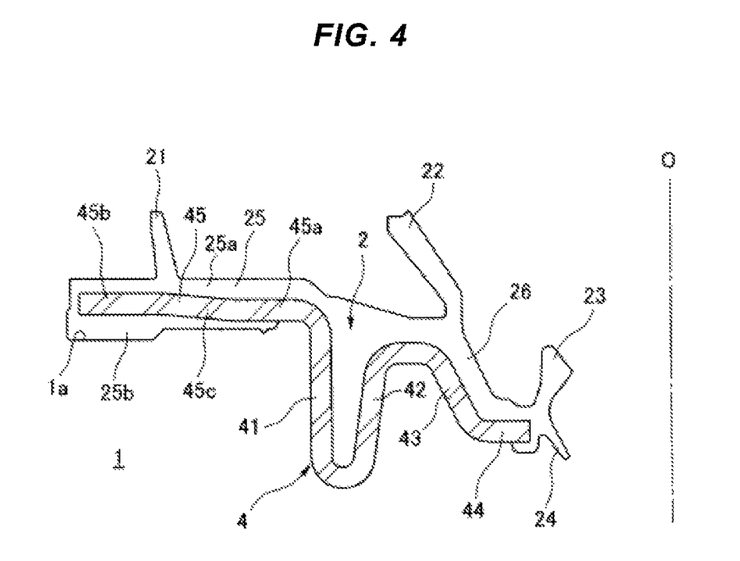
FIG. 4 is an explanatory view showing a third embodiment of the method of manufacturing the sealing device according to the present invention.

Further, a third embodiment shown in FIG. 4 is structured such that the outer diameter flange portion 45 of the reinforcing ring 4 is formed into a shape which is previously inclined to an opposite side to the direction of the bending deformation by the filling pressure when the molding material flows into the space 25a in the labyrinth lip forming space 21 side of the outer diameter flange portion coating layer forming space 25 in the cavity 2 from the plane which is orthogonal to the axis O, in an intermediate portion 45c in a diametrical direction, and is formed into a parallel shape (a disk shape) to the plane which is orthogonal to the axis O in an inner diameter portion 45a and an outer diameter portion 45b. The other structures are the same as those of the first embodiment.

According to the embodiment, the molding material is filled into the cavity 2 defined between the inner surface of the metal mold 1 and the reinforcing ring 4 from the inner peripheral side by the mold clamping after the reinforcing ring 4 is set to the metal mold 1, in the same manner as the first embodiment. Then, the molding material is filled in advance to the space 25a in the side that the labyrinth lip forming space 21 exists, in the process that the molding material flows into the outer diameter flange portion coating layer forming space 25 in the cavity 2. As a result, the outer diameter flange portion 45 is exposed to the bending deformation toward the unfilled space 25b side by the filling pressure.

However, since the outer diameter flange portion 45 of the reinforcing ring 4 has the intermediate portion 45c in the diametrical direction which is previously inclined to the opposite side to the direction of the bending deformation, the outer diameter end portion thereof is not pressed to the metal mold inner surface 1a in the space 25b side even if the outer diameter flange portion 45 is exposed to the bending deformation due to the filling pressure of the molding material. Therefore, in this case, it is possible to obtain the sealing device structured such that the outer diameter flange portion 45 of the reinforcing ring 4 is completely coated with the outer diameter flange portion coating layer 35 in the outer side of the seal portion by the anti-dust lips 32 and 33 and the close contact portion with the outer ring, in the same manner as the first embodiment.

Figure 5:
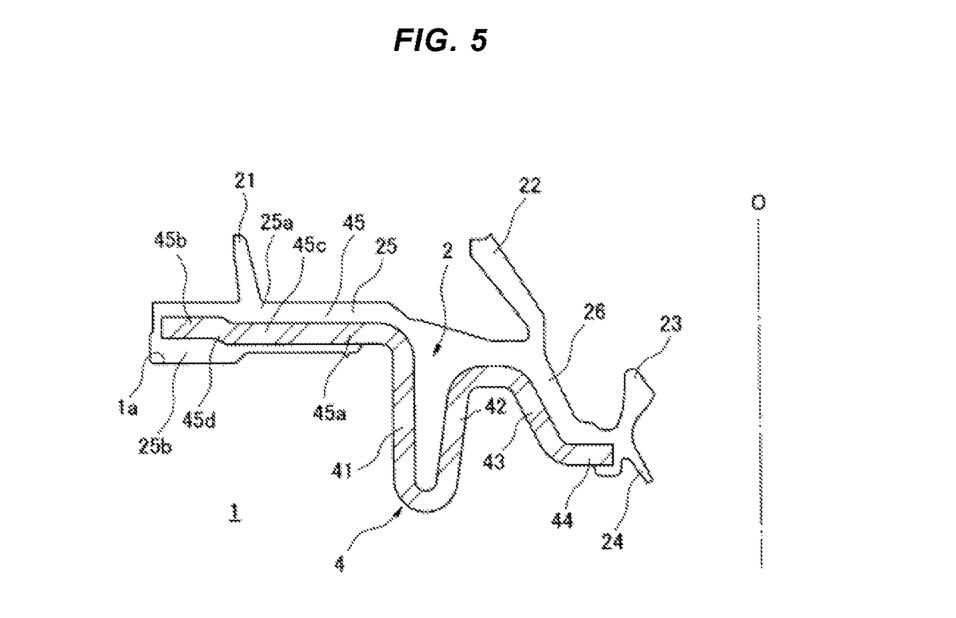
FIG. 5 is an explanatory view showing a fourth embodiment of the method of manufacturing the sealing device according to the present invention.

Further, in a fourth embodiment shown in FIG. 5, the outer diameter flange portion 45 of the reinforcing ring 4 is structured such that a portion from the inner diameter portion 45a to the intermediate portion 45c in the diametrical direction and the outer diameter portion 45b are respectively formed into the parallel shape (the disk shape) to the plane which is orthogonal to the axis O, and a step portion 45d is previously formed continuously in a circumferential direction between the intermediate portion 45c in the diametrical direction and the outer diameter portion 45b, the step portion 45d being unevenly distributed to the opposite side to the direction of the bending deformation by the filling pressure when the molding material flows into the space 25a in the labyrinth lip forming space 21 side of the outer diameter flange portion coating layer forming space 25 in the cavity 2. The other structures are the same as those of the first embodiment.

In this embodiment, the molding material is filled into the cavity 2 defined between the inner surface of the metal mold 1 and the reinforcing ring 4 from the inner peripheral side by the mold clamping after the reinforcing ring 4 is set to the metal mold 1, in the same manner as the first embodiment. Then, the molding material is filled in advance to the space 25a in the side that the labyrinth lip forming space 21 exists, in the process that the molding material flows into the outer diameter flange portion coating layer forming space 25 in the cavity 2. As a result, the outer diameter flange portion 45 is exposed to the bending deformation toward the unfilled space 25b by the filling pressure.

However, since the outer diameter portion 45b of the outer diameter flange portion 45 in the reinforcing ring 4 is previously distributed unevenly to the opposite side to the direction of the bending deformation by the step portion 45d, the outer diameter end portion thereof is not pressed to the metal mold inner surface 1a in the space 25b side even if the outer diameter flange portion 45 is exposed to the bending deformation due to the filling pressure of the molding material. Therefore, in this case, it is possible to obtain the sealing device structured such that the outer diameter flange portion 45 of the reinforcing ring 4 is completely coated with the outer diameter flange portion coating layer 35 in the outer side of the seal portion by the anti-dust lips 32 and 33 and the close contact portion with the outer ring, in the same manner as the first embodiment.

Figure 6:
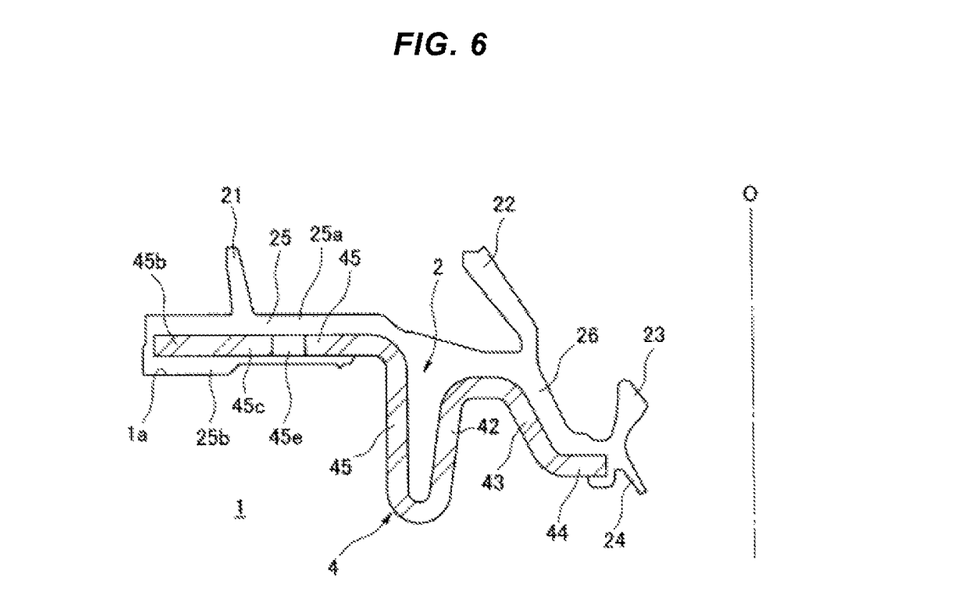
FIG. 6 is an explanatory view showing a fifth embodiment of the method of manufacturing the sealing device according to the present invention.

Further, a fifth embodiment shown in FIG. 6 is structured such that a plurality of holes 45e are previously provided at predetermined intervals in a circumferential direction in the intermediate portion 45c in the diametrical direction in the outer diameter flange portion 45 of the reinforcing ring 4. In the example shown in FIG. 6, the outer diameter flange portion 45 is formed into the disk shape, however, may be formed into the inclined or stepped shape in the same manner as the previously described first to fourth embodiments.

In this embodiment, the molding material is filled into the cavity 2 defined between the inner surface of the metal mold 1 and the reinforcing ring 4 from the inner peripheral side by the mold clamping after the reinforcing ring 4 is set to the metal mold 1, in the same manner as the first embodiment. Then, the molding material is filled to the space 25b in the opposite side via a plurality of holes 45e approximately at the same time of being filled to the space 25a in the side that the labyrinth lip forming space 21 exists, in the process that the molding material flows into the outer diameter flange portion coating layer forming space 25 in the cavity 2.

More specifically, since the filling pressure of the molding material is equalized in the spaces 25a and 25b in both sides of the outer diameter flange portion 45 of the reinforcing ring 4, the outer diameter end portion of the outer diameter flange portion 45 is not pressed to the metal mold inner surface 1a in the space 25b side. Therefore, in this case, it is possible to obtain the sealing device structured such that the outer diameter flange portion 45 of the reinforcing ring 4 is completely coated with the outer diameter flange portion coating layer 35 in the outer side of the seal portion by the anti-dust lips 32 and 33 and the close contact portion with the outer ring, in the same manner as the first embodiment.

What is claimed is:

1. A method of manufacturing a sealing device, comprising:
    providing a mold having a molding cavity, a surface of the molding cavity defining a seat;
    inserting a reinforcing ring into the mold; and
    injecting a rubber material into the mold to form a seal body on the reinforcing ring,
    wherein the reinforcing ring has a shape that corresponds to a shape of the seat such that, in a pre-injection state, a portion of the reinforcing ring mates with the seat while another portion of the reinforcing ring is spaced apart from the seat by a first distance, and
    during the injecting of the rubber material into the mold, a pressure of the rubber material on the another portion forces the another portion toward the seat such that, in a post-injection state, the another portion of the reinforcing ring is spaced apart from the seat by a second distance that is less than the first distance.

2. The method according to claim 1, wherein the another portion is inclined in a direction away from the seat to define the first distance.

3. The method according to claim 2, wherein after the another portion is forced toward the seat by the pressure of the rubber material, the another portion is substantially parallel with the seat.

4. The method according to claim 2, wherein the reinforcing ring includes a fitting tube that corresponds to the portion of the reinforcing ring that mates with the seat, an outer diameter flange that is connected to the fitting tube and corresponds to the another portion of the reinforcing ring that is spaced apart from the seat by the first distance, and an inner diameter flange that is connected to the fitting tube on an end of the reinforcing ring that is opposite to that of the outer diameter flange.

5. The method according to claim 4, wherein the inner diameter flange is inclined in a direction opposite to that of the outer diameter flange.

6. The method according to claim 4, wherein the outer diameter flange includes an intermediate portion that is positioned between an inner portion and an outer portion.

7. The method according to claim 6, wherein the intermediate portion is inclined in the direction away from the seat, and the inner portion and the outer portion are arranged substantially parallel with the seat.

8. The method according to claim 6, wherein a step is formed between the intermediate portion and the outer portion of the outer diameter flange.

9. The method according to claim 6, wherein the intermediate portion includes at least one aperture formed therein.

* * * * *